Feb. 17, 1931.  E. V. FRANCIS  1,792,533
CONVEYER
Filed Aug. 17, 1928    2 Sheets-Sheet 1
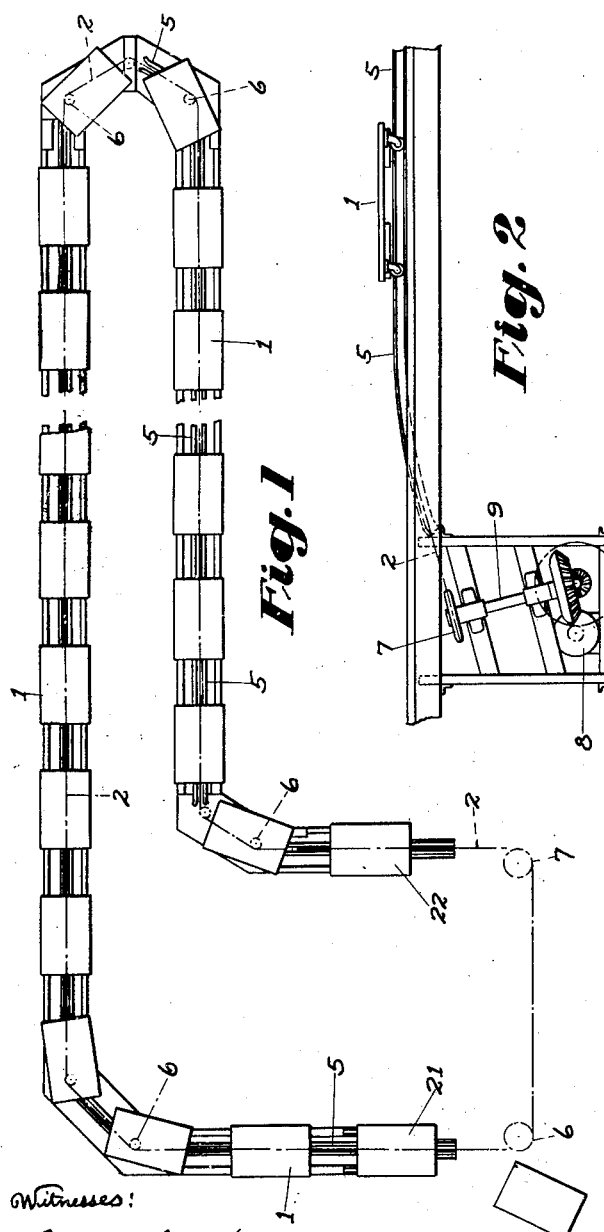
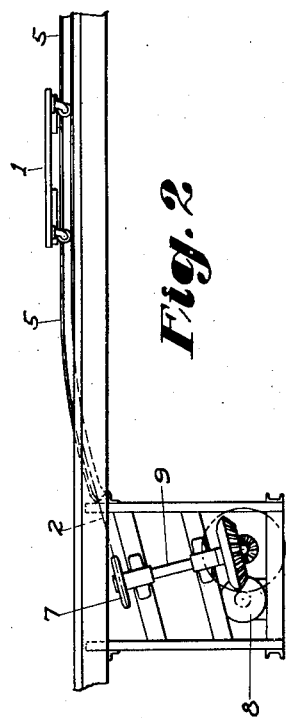
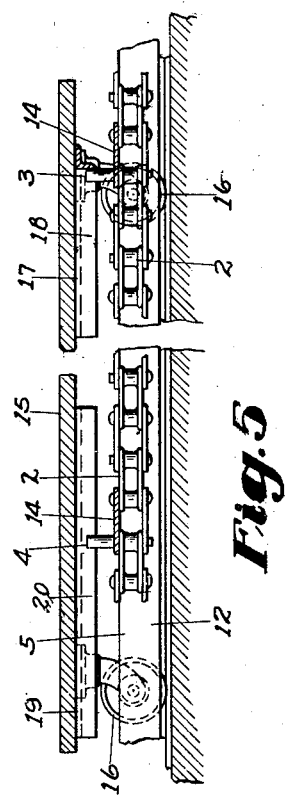
Witnesses:
R. D. Nichols
Dudley T. Fisher
Inventor
Earle V. Francis
Cushman, Bryant & Darby
Attorneys Feb. 17, 1931.  E. V. FRANCIS  1,792,533
CONVEYER
Filed Aug. 17, 1928   2 Sheets-Sheet 2
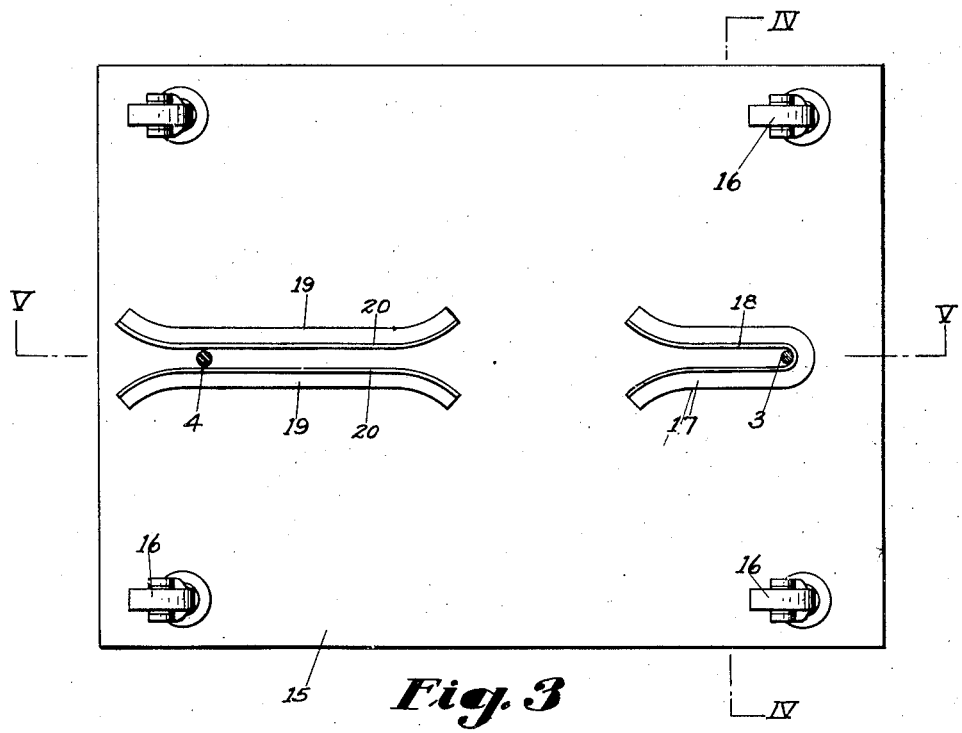
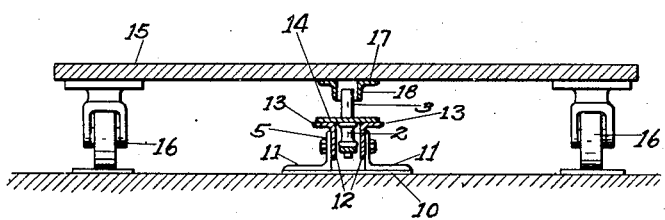
Inventor
Earle V. Francis Patented Feb. 17, 1931

1,792,533

UNITED STATES PATENT OFFICE

EARLE VERNON FRANCIS, OF COLUMBUS, OHIO, ASSIGNOR TO THE JEFFREY MANUFACTURING COMPANY, OF COLUMBUS, OHIO, A CORPORATION OF OHIO

CONVEYER

Application filed August 17, 1928. Serial No. 300,346.

The present invention relates to certain new and useful improvements in conveyers, and particularly to conveyers adapted for use in automobile body factories, and the like, for the movement of such articles as automobile bodies during the processes of manufacture.

It is the especial object of this invention to provide a conveyer comprising a plurality of carriages adapted to movement in any direction over the floor, associated with propelling and guiding devices whereby these carriages may be caused to travel in a train along a predetermined path.

A further object is to provide an endless draft member adapted to propel said carriages with means for automatically connecting and disconnecting said carriages thereto.

Another object of the invention is to provide means for preventing wiggling from side to side of the trailing end of the carriage.

The means whereby I attain these objects are fully set forth in the following specification and illustrated in the accompanying drawings of which Fig. 1 is a plan view of a conveyer constituting one embodiment of my invention.

Fig. 2 is a fragmentary side elevation of the device illustrated in Fig. 1 showing particularly the driving mechanism.

Fig. 3 is a view of the underside of one of the constituent carriages of the conveyer shown in Fig. 1.

Fig. 4 is a sectional view taken along the line IV—IV of Fig. 3.

Fig. 5 is a sectional view taken along the line V—V of Fig. 3.

Like numerals refer to similar parts in the several figures.

As shown in the drawings the preferred embodiment of my invention comprises a plurality of carriages 1 adapted to freely move in any direction over a factory floor, and an endless draft element 2 arranged in the desired path of travel and adapted to engage said carriages and propel them along said path.

As here shown the draft element 2 comprises a sprocket chain adapted to flexure in horizontal directions, and provided at spaced intervals with upstanding attachment spurs or pins 3 and 4 adapted to engage suitable cooperating devices of the carriages in the manner to be fully hereinafter described. Of course, the draft chain may be constructed to also flex in vertical directions so that it can be deflected up inclines. The chain 2 is arranged to travel in guideways 5 fixed to the factory floor and is provided with direction changing sprocket wheels 6, 6, 7, etc., which are rotatably mounted on vertical axes at the points where the direction of the guideway changes. Near the driving end of the conveyer the guideway 5 is depressed downwardly, to guide the chain 2 to the driving sprocket wheel 7 which is mounted beneath an opening in a floor, thereby affording an opening in the path of propulsion over which the carriages may be moved to position them in operative relation with the attachment spurs 3 and 4. The driving sprocket wheel 7 may be actuated from any convenient source of rotative power suitable to the conditions under which the machine operates. For purposes of illustration I have here shown an electric motor 8 connected by suitable gearing with the shaft 9 to which the sprocket wheel 7 is attached. Such devices are so well understood in the conveyer art that they are not thought to require further description and illustration at this time.

The guideway 5 comprises an elongated plate or plates 10 adapted to be attached to the floor in any preferred manner. To the plate 10 are fixed two parallel, spaced apart angle bars 11 to the upstanding flanges of which are fixed the guiding angle bars 12, the vertical flanges of which are spaced to afford only a convenient running clearance for the chain 2. The horizontally extending flanges 13 of the guide angles 12 project outwardly and afford a surface whereon may slide the laterally projecting bearing plates 14 attached to the chain 2 at each of the spurs 3 and 4. By this arrangement of parts, the spurs 3 and 4 are carried at an elevation above the floor which insures their operative relation with the attachment devices of the carriages.

Each carriage 1 comprises a platform 15 mounted upon swivelled castors 16 which are of the common self steering type adapted to turn through 360° and travel in any direction over a floor. To the forward part of the underside of the platform 15 is attached a drawbar 17, preferably formed of an angle bar bent in the form of a letter U, and having a downwardly projecting flange 18 which extends a sufficient distance from the platform 15 to engage the propelling spur 3 to operatively connect said carriage to said chain.

Fixed to the rearward part of the platform 15 are two parallel spaced longitudinally extending angle bars 19 spaced one at either side of the center line of the platform 15, the vertical flanges 20 of which are adapted to receive therebetween the spur 4 to prevent lateral movement of the platform 15 relative to the chain 2. The angle bars 19 are spaced apart a sufficient distance to permit the spur 4 to freely slide therebetween longitudinally of the platform to compensate for variations in the linear distance between the spurs 3 and 4 as the chain 2 passes around the direction changing wheels 6. At their ends the angle bars 17 and 19 are curved outwardly to afford flaring throats for convenient introduction of the spurs 3 and 4 into operative relation with the drawbar 17 and guide angles 19.

It will thus be seen that the angle bars 17 and 19, provide in effect, longitudinally extending grooves for the reception of the pins 3 and 4 of the draft element. The forward angle bar 17 which, in the present instance, is illustrated as being substantially U-shaped, may be of any other configuration with the parallel arms thereof deflected in diverging relationship, in order to properly guide the propelling pin 3 into engagement with the bridge of the angle iron to provide a propelling abutment. The angle bars 19 are located adjacent the trailing end of each carriage and serve to prevent wiggling of the trailing end of the carriage, which might be caused by the rear castors running over irregular surfaces. These bars 19 also serve to cause the trailing ends of the carriages to follow the curves or bends of the flexible draft element.

One of the uses for which the above described conveyer is especially adapted is the transportation of automobile bodies, or similar articles, through the painting and varnishing departments of the factory during the application and drying of the paint or varnish. In such an installation the objects which are to be painted or varnished, will be loaded upon the carriages 1 after which said carriages may be moved into loading position, indicated by the numeral 21 of Fig. 1, where the upward movement of the chain 2 causes the spurs 3 and 4 to engage the drawbar 17 and guide angles 19 respectively, to propel and guide such carriages with their load, along the prescribed path, to be discharged at the delivery point indicated by the numeral 22 in Fig. 1 of the drawing, where the downward movement of the chain causes automatic disengagement of the spurs 3 and 4.

The above description of my invention is illustrative and not restrictive. It is, therefore, to be understood that I do not limit myself to the precise construction here illustrated since these devices may be subject to wide variation as to detail without departure from the spirit of my invention.

What I claim is:

1. In a conveyer of the class described, the combination with a castor supported carriage adapted to freely move in any direction over a floor, of an endless draft element confined in a guideway fixed to said floor, means to longitudinally move said draft element in said guideway, and devices carried by said draft element adapted to engage said carriage to propel and guide it along said guideway, said devices being detachable from said carriage whereby the latter can be rolled in any direction over the floor free of said draft element.

2. In a conveyer of the class described, the combination with a castor supported carriage adapted to freely move in any direction over a floor, of an endless draft element confined in a guideway fixed to said floor, means to longitudinally move said draft element in said guideway, spaced apart pins projecting upwardly from said draft element and adapted to engage said carriage to propel it longitudinally of said guideway and to prevent its movement transversely thereof, said pins being detachable from said carriage whereby the latter can be rolled in any direction over the floor free of said draft element.

3. In a conveyer of the class described, the combination with a castor supported carriage adapted to freely move in any direction over a floor, of an endless draft element confined in a guideway fixed to said floor, means to longitudinally move said draft element in said guideway, spaced apart spurs projecting upwardly from said draft element, an element projecting downwardly from said carriage adapted to be engaged by said spurs to propel said carriage, and other elements projecting downwardly from said carriage adapted to be engaged by other of said spurs to prevent movement of said carriage transversely of said draft element as and for the purpose set forth.

4. In a conveyer of the class described, the combination with a castor supported carriage adapted to freely move in any direction over the floor, of an endless draft element confined in a guideway fixed to said floor, means to longitudinally move said draft element in said guideway, spaced apart spurs projecting upwardly from said draft element, a substantially U-shaped towing element carried by said carriage adapted to be engaged by said spurs to propel said carriage, and elongated longitudinally extending contact elements carried by said carriage adapted to be engaged by other of said spurs to prevent movement of said carriage transversely of said draft element as and for the purpose set forth.

5. In a conveyer of the class described, the combination with a castor supported carriage adapted to freely move in any direction over a floor, of an endless draft element confined in a guideway fixed to said floor, means to longitudinally move said draft element in said guideway, spaced apart spurs projecting upwardly from said draft element, an abutment projecting downwardly from said carriage adapted to be engaged by said spurs to propel said carriage, and two longitudinally extending parallel flanges projecting downwardly from said carriage adapted to engage opposite sides of other of said spurs to prevent movement of said carriage transversely of said element as and for the purpose set forth.

6. In a conveyer, the combination with a carriage of an endless draft element confined in a guideway fixed to said floor, means to longitudinally move said draft element in said guideway, said carriage having grooved portions adjacent the front and rear thereof, and spaced apart pins projecting upwardly from said draft element and engageable in said grooved portions of said carriage to propel and guide the same.

7. In a conveyer, the combination with a castor supported carriage adapted to freely move in any direction over a floor, a propulsion abutment carried by the front end of said carriage, said carriage being provided adjacent its rear end with a guide groove, an endless draft element movable over said floor, means to longitudinally move said draft element, and a pair of spaced pins projecting upwardly from said draft element, one of said pins being engageable with said abutment to propel said carriage, and the other pin being engageable in said guide groove to guide the rear end of said carriage.

8. In a conveyer, the combination with a castor supported carriage adapted to freely move in any direction over a floor, of an endless draft element movable over said floor, said floor having an opening into and below which said draft element travels, and means carried by said draft element automatically engageable with and disengageable from said carriage and moved into engagement with said carriage when traveling over said floor, but automatically disengageable from said carriage when moved below said floor whereby said carriage may be moved independently of said draft element in any direction over said floor.

9. In a conveyer, the combination with a carriage adapted to move over a floor, a guideway consisting of a pair of spaced angle bars having their horizontal flanges secured to the floor, a second pair of angle bars secured by their vertical flanges to the vertical flanges of said first named bars, the horizontal flanges of said second named angle bars being extended outwardly in opposite directions to form a track, an endless draft device confined in said guideway and movable longitudinally thereof, means carried by said draft device engageable with said carriage to propel the same, and laterally projecting elements secured to said draft device supported upon said horizontal flanges of said second named bars to support said draft device above the floor.

10. In a conveyer, the combination with a carriage freely movable in any direction over a floor, an endless draft element movable over the floor, devices carried by said draft element adapted to engage said carriage to propel and guide it along, and said devices being detachable from said carriage whereby the latter can be moved over the floor free of said draft element.

11. In a conveyer, the combination with a carrier; of an endless draft element movable over a support, and a pair of spaced apart pins projecting upwardly from said draft element and adapted to simultaneously engage said carrier to propel it over the support and prevent its movement transversely of the draft element.

12. In a conveyer, the combination with a carrier; of an endless draft element movable over a support, said carrier having pin receiving portions adjacent the front and rear thereof, and spaced apart pins projecting upwardly from said draft element and engageable in said pin receiving portions of the carrier to propel and guide the same.

13. In a conveyer, the combination with a carriage adapted to move freely in any direction over a floor; of an endless draft element movable over said floor, said floor having an opening into and below which said draft element travels, and means carried by said draft element automatically engageable with and disengageable from said carriage and moved into engagement with said carriage when travelling over said floor, but automatically disengageable from said carriage when moved below said floor, whereby said carriage may be moved independently of said draft element in any direction over said floor.

14. In a conveyer, the combination with a carrier adapted to move over a support; of draft means having means engageable with the carrier adjacent one end to propel the same, and means carried by the draft means and engageable with the carrier adjacent its other end to prevent movement of the carrier transversely of said draft means.

15. In a conveyer, the combination with a carrier adapted to move over a support; of draft means movable about a curve and having means engageable with the carrier adjacent one end to propel the same, and means carried by the draft means and engageable with the carrier adjacent its other end to cause both ends of the carrier to follow the curve of said draft means.

16. In a conveyer, the combination with a castor-supported carriage; of draft means movable over a floor and about a curve, said draft means being engageable with the carriage at its forward end to tow the same, and means carried by the draft means and engageable with the trailing end of the carriage to cause it to follow the curve of the draft means.

17. In a conveyer, the combination with a carrier adapted to move over a support; of draft means movable over the support, an upwardly projecting draft member carried by the draft element, an abutment carried by said carrier, and means converging toward said abutment for guiding the propecting member into engagement therewith.

18. In a conveyer, the combination with a carrier adapted to move over a support; of an endless draft element having a projecting member adapted to engage the carrier to propel the same, an abutment carried by the carrier for engagement with said projecting member whereby the carrier is propelled, and a pair of members converging toward said abutment member for guiding the projecting member into engagement therewith.

19. In a conveyer, the combination with a carrier adapted to move over a support; of an endless draft element having spaced apart projecting members, an abutment on the carrier for engagement with one of said members for propelling the carriage, and a pair of spaced elements on the carrier adapted to engage opposite sides of the other projecting member to prevent movement of the carrier transversely of said draft element.

In testimony whereof I have hereunto set my hand.

EARLE VERNON FRANCIS.